United States Patent
Masuda et al.

(10) Patent No.: US 7,465,961 B2
(45) Date of Patent: Dec. 16, 2008

(54) ELECTRONIC EQUIPMENT, BACKLIGHT STRUCTURE AND KEYPAD FOR ELECTRONIC EQUIPMENT

(75) Inventors: Masatsugu Masuda, Yamatotakada (JP); Masaaki Katoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1 day.

(21) Appl. No.: 10/806,109

(22) Filed: Mar. 23, 2004

(65) Prior Publication Data
US 2004/0188639 A1   Sep. 30, 2004

(30) Foreign Application Priority Data
Mar. 25, 2003 (JP) .............. 2003-082913
Mar. 26, 2003 (JP) .............. 2003-085630

(51) Int. Cl.
*H01L 33/00* (2006.01)
(52) U.S. Cl. .............. 257/98; 257/99; 257/436; 257/460; 257/E33.067
(58) Field of Classification Search ........... 257/79–103, 257/436, 460
See application file for complete search history.

(56) References Cited

U.S. PATENT DOCUMENTS

| | | | | |
|---|---|---|---|---|
| 5,083,240 | A * | 1/1992 | Pasco .................. | 362/26 |
| 5,546,457 | A | 8/1996 | Masashi et al. | |
| 5,752,337 | A * | 5/1998 | Chien .................. | 40/540 |
| 6,100,478 | A * | 8/2000 | LaPointe et al. ......... | 200/314 |
| 6,469,322 | B1 * | 10/2002 | Srivastava et al. ......... | 257/89 |
| 2002/0105795 | A1 * | 8/2002 | Huang ................. | 362/85 |
| 2003/0117794 | A1 * | 6/2003 | Lu et al. .............. | 362/84 |

FOREIGN PATENT DOCUMENTS

| | | | |
|---|---|---|---|
| JP | 4-354232 | A | 12/1992 |
| JP | 06-076684 | A | 3/1994 |
| JP | 08-273474 | | 10/1996 |
| JP | 11-224556 | A | 8/1999 |
| JP | 2001-167655 | A | 6/2001 |
| JP | 2001-167655 | A | 6/2001 |

(Continued)

OTHER PUBLICATIONS

Physical of Semiconductor Device by S.M. Sze, second edition (p. 683 fig. 1).*

*Primary Examiner*—Wai-Sing Louie
(74) *Attorney, Agent, or Firm*—Birch, Stewart, Kolasch & Birch, LLP

(57) ABSTRACT

An electronic equipment includes a light source, in which light of the light source is guided and emitted from an operation member having translucent properties via an optical waveguide, wherein a phosphor emitting visible light by being excited by the light from the light source is contained in a path through which the light of the light source is guided. A backlight structure in which a light source is provided in a printed substrate that is inside a casing having a waveguide plate, and light of the light source is transmitted through the waveguide plate and emitted, wherein a wavelength-converting phosphor that emits light by being excited by the light of the light source is provided in a waveguide path leading to a point where the light of the light source is transmitted through the waveguide plate and is emitted out, except the light source and the printed substrate.

17 Claims, 9 Drawing Sheets

FOREIGN PATENT DOCUMENTS

| | | |
|---|---|---|
| JP | 2001-297617 A | 10/2001 |
| JP | 2001-320091 | 11/2001 |
| JP | 2002-171000 A | 6/2002 |
| JP | 2002-352609 | 12/2002 |
| WO | WO-02/054503 A1 | 7/2002 |

* cited by examiner

ELECTRONIC EQUIPMENT, BACKLIGHT STRUCTURE AND KEYPAD FOR ELECTRONIC EQUIPMENT

BACKGROUND OF INVENTION

This Nonprovisional application claims priority under 35 U.S.C. § 119(a) on Patent Application No. 2003-085630 filed on Mar. 26, 2003 and No. 2003-082913 filed on Mar. 25, 2003 in JAPAN, the entire contents of which are hereby incorporated by reference.

The present invention relates to various electronic equipments such as mobile phones, cordless phones or PDA (Personal Digital Assistant: mobile information terminal), a backlight structure that can be used suitably in these electronic equipments and can provide unique emission colors, and a keypad for an electronic equipment that is suitable for such a backlight structure.

In recent years, design has become increasingly important in order to provide satisfaction from owning an electronic equipment as above, and the "cover changeable" type in which a housing cover can be exchanged to meet the diversity of tastes of users has become popular. Not only for housing covers, but also for other portions of the equipment, it is advantageous to increase the degree of freedom of design in order to provide satisfaction to the users.

On the other hand, an electronic equipment as above tends to include a mechanism for illuminating a display panel or operation keys so that the equipment can be operated even in a dark environment.

Conventionally, one example of known techniques for illuminating a plurality of keytops with a few number of LEDs is that an optical waveguide for backlight is provided inside a housing, light from a few number of LEDs is supplied to a plurality of keytops via the optical waveguide and the visibility in a dark environment is improved (e.g., Japanese Laid-Open Patent Publication No. 2001-167655).

FIG. 8 is a cross-sectional view of an operation key and its periphery in an electronic equipment 10, which is one example of such a conventional art.

As shown in FIG. 8, a thin plate-like printed substrate 7 is disposed parallel to a housing 5 below the inner surface of the housing 5 of the electronic equipment 10, and an opening portion 5a for operation key arrangement is formed on the upper surface of the housing 5.

A chip-like LED 2 is disposed in a position apart from the portion immediately below the opening portion 5a on the printed substrate 7, so that visible light for illuminating the operation key can be emitted. Furthermore, a keytop 3a is disposed as an operation key having substantially the same size as that of the opening portion 5a immediately below the opening portion 5a on the printed substrate 7. The keytop 3a is formed such that its upper surface is flat and is slightly projected from the opening portion 5a to the outside of the housing 5.

Furthermore, a flexible optical waveguide 3 is disposed so as to fill the remaining space between the inner surface of the housing 5 and the printed substrate 7, and the light emitted from the LED 2 is guided through the optical waveguide 3 to surrounding portions. In FIG. 8, the keytop 3a and the optical waveguide 3 are formed into one piece, but the present invention is not limited thereto, and the keytop 3a can be a separate transparent or semi-transparent member having translucent properties.

The light emitted from the LED 2 is guided to the keytop 3a through the optical waveguide 3 and further guided out from the keytop 3a to the outside of the electronic equipment 10, so that this light can be seen from the outside of the electronic equipment 10. The operation key is illuminated with this structure.

A swallow bowl-like recess 3b is formed on the lower surface of the keytop 3a, and the bottom portion of the recess 3b is flat. A thin plate-like conductor 6 is disposed in the flat portion of the bottom portion, and when the keytop 3a is pressed down by the operation of a user, the flexible optical waveguide 3 is bent and the conductor 6 disposed in the recess 3b is brought in contact with a contact point (not shown) disposed on the upper surface of the printed substrate 7 so that the switch is turned on. Thus, the key operation of the user can be detected by control means (not shown) of the electronic equipment 10.

FIG. 9 is a schematic view of a mobile phone 20 in which an example of another conventional art is used. FIG. 10A is a cross-sectional view showing the outline of the internal structure of the mobile phone 20. FIG. 10B is a partially enlarged cross-sectional view (ten key portion) showing the outline of the internal structure of the mobile phone 20.

In this mobile phone 20, a ten key portion 20a and a liquid crystal screen portion 20b provided in a mobile phone main body 21 are configured so as to emit light when they are in use or in other occasions. For this, a backlight structure 30 is provided inside the mobile phone main body 21.

The backlight structure 30 for the ten key portion 20a and the liquid crystal screen portion 20b has the structure as shown in FIGS. 10A and 10B. More specifically, the ten key portion 20a is configured such that LEDs 2 are provided in a printed substrate 7 provided inside the mobile phone main body 21, and light from the LEDs 2 is transmitted through respective keypads 23 constituting the ten key portion 20a and is emitted. The liquid crystal screen portion 20b is configured such that a liquid crystal cell 8 is provided in the printed substrate 7 via a backlight waveguide plate 9, and light from a LED 2a provided adjacent to the backlight waveguide plate 9 is transmitted through the backlight waveguide plate 9 and is emitted.

In such a backlight structure 30, visible light chips are used for the LEDs 2 and the LED 2a.

SUMMARY OF INVENTION

An electronic equipment in accordance with one or more embodiments of the present invention is an electronic equipment comprising at least one light source, in which light of the light source is guided and emitted from an operation member having translucent properties via an optical waveguide, wherein a phosphor emitting visible light by being excited by the light from the light source is contained in a path through which the light of the light source is guided.

In the embodiments of the present invention, the light source can emit light in a wavelength region that can excite the phosphor contained in the optical waveguide. For example, the wavelength region is for ultraviolet or near-ultraviolet rays. A specific example of the light source is a LED, but there is no limitation thereon. As the type of the phosphor, phosphors emitting fluorescence of R (red)/G (green)/B (blue) can be known.

According to the embodiments of the present invention, the illumination color of the operation member of an electronic equipment can be determined by selecting, not the color of the light source for illumination itself, but the type of the phosphor. Thus, the degree of freedom of selection of the illumination color can be increased.

Furthermore, in the electronic equipment of the embodiments of the present invention, the operation member may be constituted by a plurality of keytops.

According to the embodiments of the present invention, when a plurality of operation keys of an electronic equipment are illuminated with light sources in the number smaller than the total number of the operation keys, the illumination color of the operation keys can be determined by selecting, not the color of the light source for illumination itself, but the type of the phosphor contained in the optical waveguide. Thus, the degree of freedom of selection of the illumination color of the operation keys can be increased.

Furthermore, in the electronic equipment of the embodiments of the present invention, the phosphor may be contained in the vicinity of the light source. Moreover, the phosphor may be constituted by a plurality of types of phosphors that emit light with different colors each other.

According to the embodiments of the present invention, the phosphor is contained in the vicinity of the light source where light is the strongest in the path through which the light of the light source is guided. Thus, the phosphor can efficiently receive light for excitation from the light source, and can emit more fluorescence. Furthermore, light having a neutral color as a whole can be emitted by mixing a plurality of types of phosphors emitting with different colors. If three phosphors emitting fluorescence with the three primary colors of R/G/B are used, the color of the emitted light can be set freely by changing the mixing ratio thereof. Thus, the degree of freedom of selection of the illumination color can be further increased.

Furthermore, in the electronic equipment of the embodiments of the present invention, the phosphor may be contained in the plurality of keytops. Furthermore, the phosphor may be constituted by a plurality of types of phosphors that emit light with different colors each other.

According to the embodiments of the present invention, the phosphor is contained in the keytops that can be seen directly by the user of the electronic equipment in the path through which the light of the light source is guided. More specifically, the operation keys themselves emit light. Furthermore, the color for illumination can be changed for each operation key by using a plurality of types of phosphors emitting with different colors.

Thus, the visibility during illumination of the operation keys can be improved. If the color for illumination can be changed for each operation key, the appearance as good as in a bright environment also can be obtained during illumination of the operation keys, and each operation key can be identified easily, which can realize high operability.

Furthermore, in the electronic equipment of the embodiments of the present invention, the plurality types of phosphors may be arranged such that patterns, designs, letters, symbols or an arbitrary combination thereof can be recognized with their emitted light with the different colors. Alternatively, either one or at least two of the plurality of types of phosphors may be contained in each of the plurality of keytops.

According to the embodiments of the present invention, with a plurality of fluorescent colors, the operation keys are illuminated in such a manner that patterns, designs, letters, symbols or an arbitrary combination thereof can be seen on the operation keys as if by multicolor printing. Alternatively, different fluorescent colors can be used for the operation keys, or the combination of colors can be changed when at least two fluorescent colors are used. Thus, the identification properties during illumination of the operation keys can be improved further, and the color representation properties can be enhanced.

Furthermore, in the electronic equipment of the embodiments of the present invention, the plurality of keytops and the optical waveguide may be integrated into one piece, and the integrated piece including the plurality of keytops and the optical waveguide may be configured to be removable with respect to the main body of the electronic equipment.

According to the embodiments of the present invention, the phosphor that determines the illumination color can be changed simply by exchanging the integrated piece including the plurality of keytops and the optical waveguide to another piece. Thus, the illumination color of the operation keys can be changed very easily without disintegrating and modifying the main body of the electronic equipment to replace the light source.

Furthermore, a backlight structure in accordance with one or more embodiments of the present invention is a backlight structure in which at least one light source is provided in a printed substrate that is inside a casing having a waveguide plate, and light of the light source is transmitted through the waveguide plate and emitted, wherein a wavelength-converting phosphor that emits light by being excited by the light of the light source is provided in a waveguide path leading to a point where the light of the light source is transmitted through the waveguide plate and is emitted out, except the light source and the printed substrate.

When the emission wavelength of the light source is smaller than 400 nm, the light is ultraviolet light that may adversely affect the human body and cause large damage, especially, to eyes. Therefore, in view of safety and health, visible light having an emission wavelength of 400 nm or more is preferable. Furthermore, an emission wavelength of larger than 430 nm can be used, but in the case of a short emission wavelength of 430 nm or less, light energy is large and external efficiency is high. Therefore, in view of little power and low running cost, an emission wavelength of 430 nm or less is preferable. In other words, it is preferable that the emission wavelength is in the range from 400 to 430 nm. A specific example of such a light source is a blue violet LED having an emission wavelength of 400 to 430 nm. When such a blue violet LED is used, emitted light that is safe and provides good energy efficiency can be obtained. However, the light source is not limited to such a blue violet LED.

In the above-described backlight structure, the wavelength-converting phosphor may be contained in the waveguide plate so as to be dispersed or applied to the waveguide plate. Furthermore, in the above-described backlight structure, a color tone changing sheet containing the wavelength-converting phosphor may be provided in the waveguide path. It is sufficient that the waveguide path is within a path leading to a point where the light of the light source is transmitted through the waveguide plate and can be recognized as emitted light from the outside of the casing. The color tone changing sheet can be, for example, interposed between the light source and the waveguide plate, or attached to the back face or the surface of the waveguide plate.

According to the backlight structure of the embodiments of the present invention, the light of the light source is transmitted through the waveguide plate and is emitted. In this case, part of the light falls on the wavelength-converting phosphor and its wavelength is converted so that the light has another color. As a result, light with a color tone in which the two types of light are mixed is emitted. When a plurality of types of wavelength-converting phosphors are used, there are a plurality of colors derived from light whose wavelength is converted. Therefore, an even more complex color tone can be represented for the emitted light. However, the amount of the wavelength-converting phosphor used is increased too much, the amount of light having another color that is absorbed by the wavelength-converting phosphor and whose wavelength is converted becomes larger than the amount of the light of the light source that is transmitted through the waveguide plate. Therefore, the optical energy efficiency is decreased. Thus, in use of the wavelength-converting phosphor, it is necessary to consider so that the emitted light does not become dark.

The wavelength-converting phosphor is provided in a portion except the light source and the printed substrate in the waveguide path leading to a point where the light of the source is transmitted through the waveguide plate and is emitted out. Therefore, when changing the emission color again after the emission color is changed, bothering soldering work in which the light source is removed from the printed substrate to be replaced by another light source can be eliminated and the light source can be changed with simple work.

Furthermore, an electronic equipment in accordance with one or more embodiments of the present invention in which the above-described backlight structure is used, is an electronic equipment, wherein at least a keypad serves as the waveguide plate, and a key backlight serves as the light source.

This backlight structure can be used in an electronic equipment such as a mobile phone. In this case, the keypad can emit light with a desired color tone, depending on the type of the wavelength-converting phosphor used.

Furthermore, the electronic equipment of the embodiments of the present invention may be an electronic equipment configured so as to be foldable at a hinge portion, wherein in addition to the keypad, the hinge portion serves as the waveguide plate, and light of the key backlight is guided to the hinge portion. Alternatively, the electronic equipment of the embodiments of the present invention may be an electronic equipment comprising an antenna portion, wherein in addition to the keypad, the antenna portion serves as the waveguide plate, and light of the key backlight is guided to the antenna portion. In these cases, the hinge portion and the antenna portion of the electronic equipment such as a mobile phone also can emit light with a desired color tone, depending on the type of the wavelength-converting phosphor used.

In the cases of these electronic equipments, each key of the keypad can emit light with a different color tone, or the keypad, the hinge portion and the antenna portion can emit light with different color tones, depending on the type or the amount of the wavelength-converting phosphor used in each of the portions.

Furthermore, an electronic equipment in accordance with one or more embodiments of the present invention may be an electronic equipment, in which light of a backlight is transmitted through an operation member and is emitted, wherein a wavelength-converting phosphor paint that emits light by being excited by the light of the backlight is provided. In these embodiments, it is preferable that the emission wavelength of the backlight is in the range from 400 to 430 nm. A specific example of the light source is a blue violet LED, but there is no limitation thereon.

In this case, the color tone of the emitted light is varied, depending on the amount of the wavelength-converting phosphor paint applied, that is, the amount of the wavelength-converting phosphor dispersed, so that the color tone of emitted light to meet the preference can be obtained.

However, if the amount of the wavelength-converting phosphor paint applied is wrong, light with a desired color tone cannot be emitted. Therefore, when a blue violet LED having an emission wavelength of 400 to 430 nm is used as a key backlight for illuminating the keypads, a keypad in which predetermined amounts of the wavelength-converting phosphors are mixed can be prepared so that light with a desired color tone can be emitted with this blue violet LED. In this case, light with a desired color tone can be emitted simply by replacing the keypad as an exchange part of the mobile phone.

Furthermore, a keypad for an electronic equipment in accordance with one or more embodiments of the present invention is configured so as to be used in an electronic equipment including at least one backlight, wherein a wavelength-converting phosphor is mixed. In these embodiments, it is preferable that the emission wavelength of the backlight is in the range from 400 to 430 nm. A specific example of the light source is a blue violet LED, but there is no limitation thereon.

According to the keypad for an electronic equipment of the embodiments of the present invention, the keypad for an electronic equipment can emit light with a desired color tone, depending on the amount or the type of the wavelength-converting phosphor mixed.

DESCRIPTION OF PREFERRED EMBODIMENTS

Hereinafter, embodiments of the present invention will be described with reference to the accompanying drawings.

First Embodiment

Figure 1:
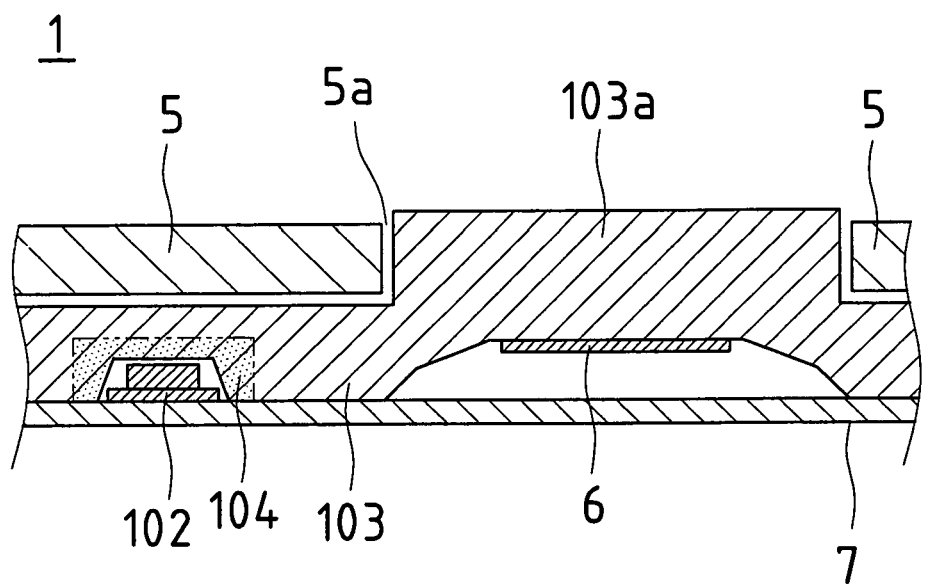
FIG. 1 is a cross-sectional view of an operation key and its periphery in an electronic equipment of a first embodiment of the present invention.

FIG. 1 is a cross-sectional view of an operation key and its periphery in an electronic equipment 1 of a first embodiment of the present invention.

Figure 8:
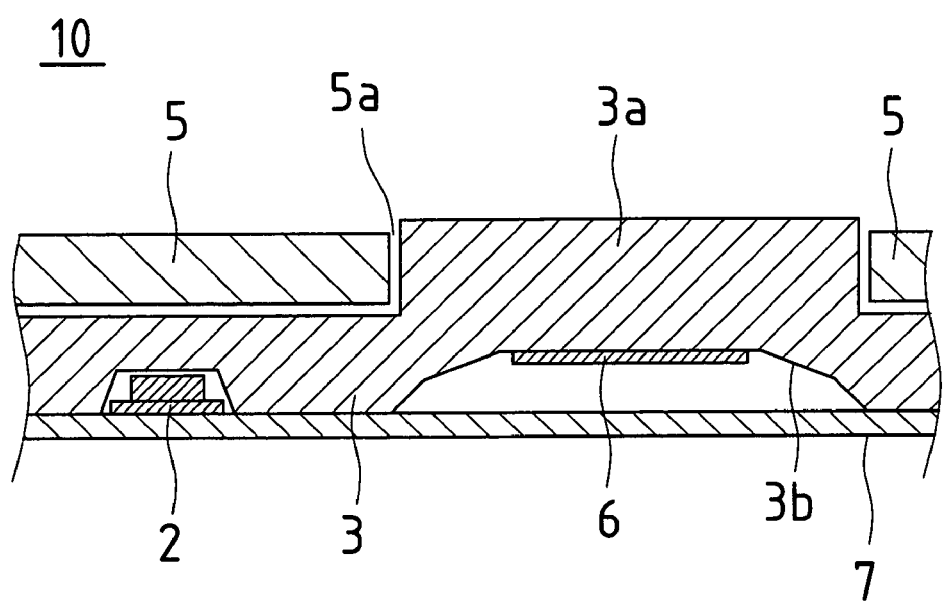
FIG. 8 is a cross-sectional view of an operation key and its periphery in an electronic equipment of an example of a conventional art.
Figure 9:
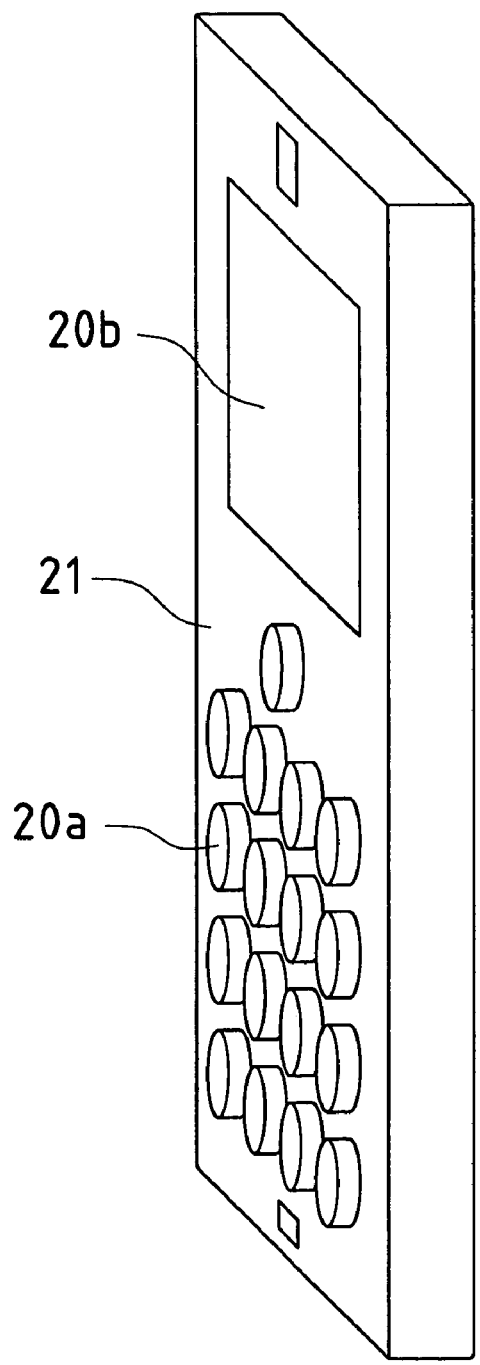
FIG. 9 is a schematic view of a mobile phone in which another example of a conventional art is used.

The first embodiment is the same as the conventional art described with reference to FIG. 8 except the following aspects, so that the same components bear the same reference numeral, and only differences will be described below.

As shown in FIG. 1, in an optical waveguide 103 filling a space between a housing 5 and a printed substrate 7, a phosphor 104 is contained in a portion surrounding a LED 102 on a chip disposed on the printed substrate 7.

In this embodiment, the LED 102 has the same shape as that of the LED 2 (see FIG. 8), but the wavelength region of its emitted light is different. For example, the wavelength region of the emitted light of the LED 102 is for ultraviolet or near-ultraviolet rays, and the LED 102 emits light having a wavelength that excites the phosphor 104. More specifically, the LED 102 does not directly illuminate the key with the emitted light, but serves as a light source for exciting the phosphor 104.

According to the configuration described above, the light for excitation emitted from the LED 102 is absorbed by the phosphor 104 surrounding the LED 102, and the phosphor 104 emits fluorescence of a color corresponding to its type. The fluorescence emitted from the phosphor 104 is guided to a keytop 103a through an optical waveguide 103, so that the keytop 103a is illuminated with the color of the fluorescence emitted from the phosphor 104.

Phosphors emitting colors of R (red), G (green) and B (blue) are known as the type of the phosphor, so that the color for illumination can be selected by selecting the type of the phosphor. If a plurality of types of phosphors corresponding to different colors are mixed, illumination with neutral colors can be achieved, thus increasing the range of color representation.

As shown in FIG. 1, when the phosphor 104 is contained so as to be concentrated in the vicinity of the LED 102, light for excitation can be efficiently received from the LED 102, so that the phosphor 104 can emit more fluorescence.

Second Embodiment

Figure 2:
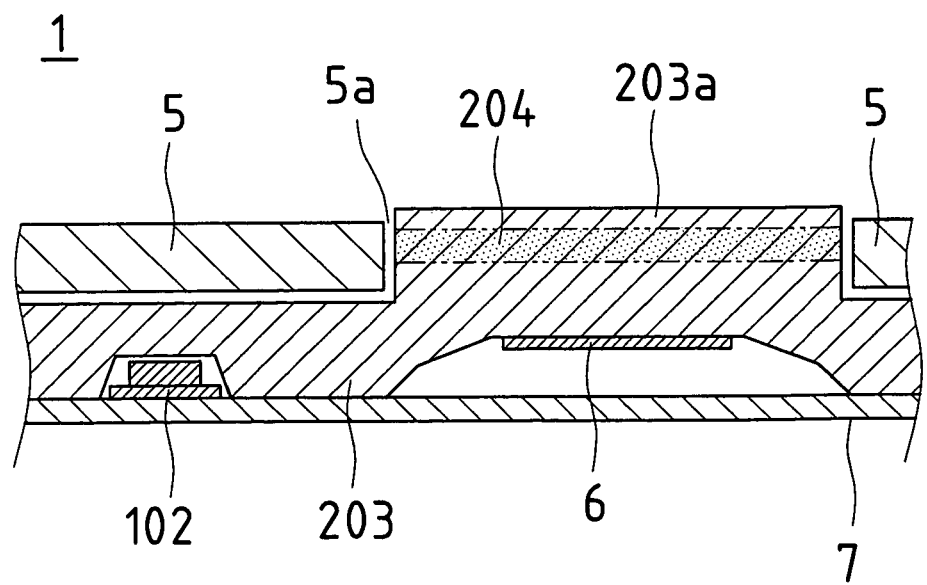
FIG. 2 is a cross-sectional view of an operation key and its periphery in an electronic equipment of a second embodiment of the present invention.

FIG. 2 is a cross-sectional view of an operation key and its periphery in an electronic equipment 1 of a second embodiment of the present invention.

The second embodiment is the same as the first embodiment except the following aspects, so that the same components bear the same reference numeral, and only differences will be described below.

As shown in FIG. 2, a phosphor 204 is contained across the portion immediately below the upper surface of a keytop 203a that serves as an operation key slightly projected from an opening portion 5a.

According to the configuration described above, the light for excitation emitted from the LED 102 is guided to the phosphor 204 contained in the portion immediately below the upper surface of a keytop 203a through the optical waveguide 203. The guided light for excitation is absorbed by the phosphor 204, and the phosphor 204 emits fluorescence of a color corresponding to its type. Thus, the keytop 203a is illuminated with this fluorescence.

Thus, keytop 203a itself emits light, so that the visibility of the operation key can be improved. If varied phosphors having different emission colors are contained, each operation key can be recognized easily by the difference in illumination color even in a dark environment.

Third Embodiment

Figure 3:
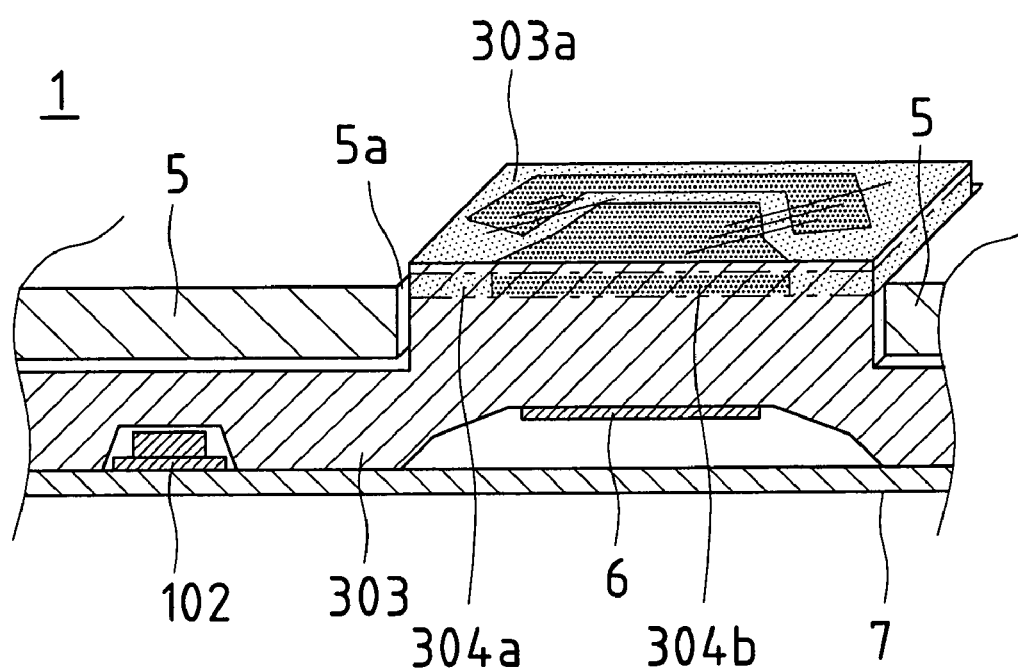
FIG. 3 is a view of a section that is viewed from obliquely above of an operation key and its periphery in an electronic equipment of a third embodiment of the present invention.

FIG. 3 is a view of a section that is viewed from obliquely above of an operation key and its periphery in an electronic equipment 1 of a third embodiment of the present invention.

The third embodiment is the same as the second embodiment except the following aspects, so that the same components bear the same reference numeral, and only differences will be described below.

As shown in FIG. 3, a first phosphor 304a of white fluorescence and a second phosphor 304b of red fluorescence are contained in a portion immediately below the upper surface of a keytop 303a that serves as an operation key slightly projected from an opening portion 5a. In this embodiment, the phosphors 304a and 304b are contained in an arrangement in which when the keytop 303a is viewed from above, patterns, letters or numbers indicating the function of the operation key are represented.

According to the configuration described above, for example, if the phosphor 304b, which emits red fluorescence, is arranged in the portion corresponding to the pattern of the operation keys or the like, and the phosphor 304a, which emits white fluorescence, is arranged in the background portion of the pattern of the operation keys or the like, then the entire operation keys are bright with white color and the patterns or the like are bright with red color in the background emitting while light, when the operation keys are illuminated.

Furthermore, if a pattern is designed in a multicolored printing manner by arranging many types of phosphors as appropriate in accordance with each operation key, the identification properties during illumination of the operation key can be improved and better color representation can be obtained.

Fourth Embodiment

Figure 4:
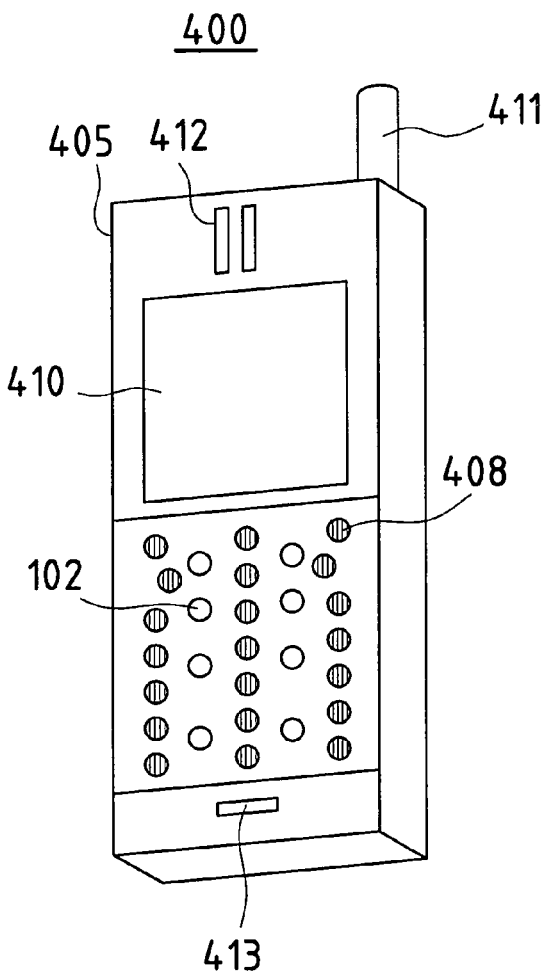
FIG. 4A is a schematic view of the main body of an electronic equipment of a fourth embodiment of the present invention.
FIG. 4B is a schematic view of an operational portion cover that is removable with respect to the main body of the electronic equipment of the fourth embodiment of the present invention.
Figure 4:
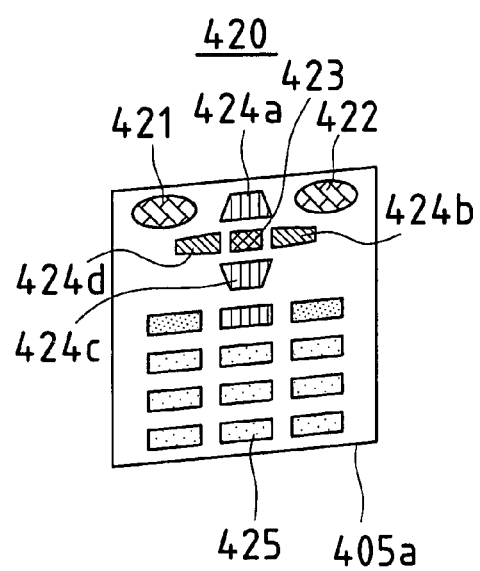

FIG. 4A is a schematic view of the main body 400 of an electronic equipment of a fourth embodiment of the present invention. FIG. 4B is a schematic view of an operational portion cover 420 that is removable with respect to the main body 400 of the electronic equipment of the fourth embodiment of the present invention.

As shown in FIG. 4A, a housing 405 of the equipment body 400 has a box-like shape in which the horizontal side is long, and the depth is small. In the upper portion of the front surface of the housing 405, a rectangular liquid crystal display screen 410 that is smaller than that upper portion is disposed to display various information. A round rod-like antenna 411 is retractably provided on the upper right end portion of the housing 405. The antenna 411 is extended when the equipment is used as a mobile phone for conversation or communications, and in other cases, the antenna 411 is retracted and the majority part thereof is housed inside the equipment body 400, and thus only the top end portion is projected with a small height, which improves the portability.

In the vicinity of the upper end of the liquid crystal display screen 410 on the front surface of the housing 405, a speaker 412 is provided inside the housing 405, and the voice of the person with whom the user is talking that is reproduced by the speaker 412 can be heard through grooves elongated in the longitudinal direction that are formed in the housing 405. On the other hand, in the vicinity of the lower end on the front surface of the housing 405, a microphone 413 is provided inside the housing 405 and captures the voice of the user during conversation through a groove elongated in the lateral direction that is formed in the housing 405 and converts the voice to electric signals.

On the front surface of the housing 405, an operational portion cover 420, which will be described later, is provided removably in a portion sandwiched by the liquid crystal display screen 410 and the microphone 413, and small round contact points 408 are arranged in positions corresponding to the operation keys arranged on the operational portion cover 420. Furthermore, a smaller number of chip-like LEDs 102 than the total number of the operation keys are arranged in the positions sandwiched by each contact point 408.

On the other hand, as shown in FIG. 4B, the operational portion cover 420 is configured such that a rectangular plate-like housing 405a having opening portions in the positions corresponding to the operation keys, an optical waveguide (not shown) containing a phosphor as described above, and keytops arranged in the positions corresponding to the operation keys are formed integrally, and can be attached and removed at the front of the housing 405 by a mechanism not shown.

In the operational portion cover 420, a first operation key 421 and a second operation key 422 are arranged in the left and the right side of the upper end portion of the operational portion cover 420, respectively, so that the principal functions of the equipment body 400 are operated by an operation of a user. A selection and execution key 423 is provided slightly below the position sandwiched by the first operation key 421 and the second operation key 422, and selection of a function that is desired by the user from a function menu or the like of the equipment body 400 and execution of the function are designated by an operation of the user. Four direction keys 424a, 424b, 424c and 424d are arranged in the upper, the right, the lower and the left portion of the selection and execution key 423, and shifting in a function menu or the like of the equipment body 400 is instructed by an operation of the user. In substantially the lower portion of the operational portion cover 420, twelve number and symbol keys 425 are arranged on lattice points constituted by three vertical columns and four horizontal rows, with which numbers of 0 to 9 or symbols are entered by an operation of the user.

According to the configuration described above, since a phosphor is contained in the optical waveguide that is integrated in the operational portion cover 420, the phosphor can be changed simply by replacing the operational portion cover 420 by another cover. In other words, a large modification in which the LEDs soldered onto the substrate are replaced by disintegrating the main body of the electronic equipment is not necessary in order to change the color of illumination of the operation keys.

Thus, with very easy operation of replacing the operational portion cover 420, a "key bottom emission color changing mobile phone" in which an illumination color or a pattern on the operation keys can be changed in accordance with preference of the user can be realized.

In the fourth embodiment, the present invention is applied to a mobile phone, for example, but the present invention is not limited to a mobile phone, and can be applied in a wide range of electronic equipments. Furthermore, the fourth embodiment can be combined with any one of the first embodiment, the second embodiment and the third embodiment.

The drawings (FIGS. 1, 2, and 3) of the first, the second, and the third embodiments, respectively, show that the optical waveguide and the keytop are included in the same member, but the present invention is not limited thereto, and the keytop can be formed of a separate transparent or semi-transparent member having translucent properties.

Fifth Embodiment

Figure 5:
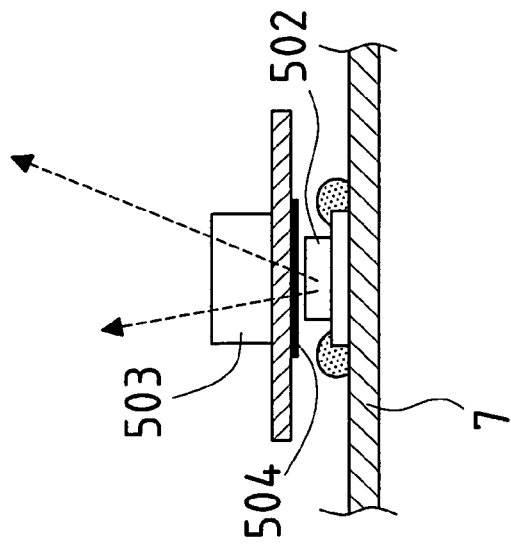
FIG. 5A is a cross-sectional view showing the outline of the internal structure of a mobile phone utilizing a backlight structure of a fifth embodiment of the present invention.
FIG. 5B is a partially enlarged cross-sectional view (ten key portion) showing the outline of the internal structure of the mobile phone utilizing a backlight structure of the fifth embodiment of the present invention.
Figure 5:
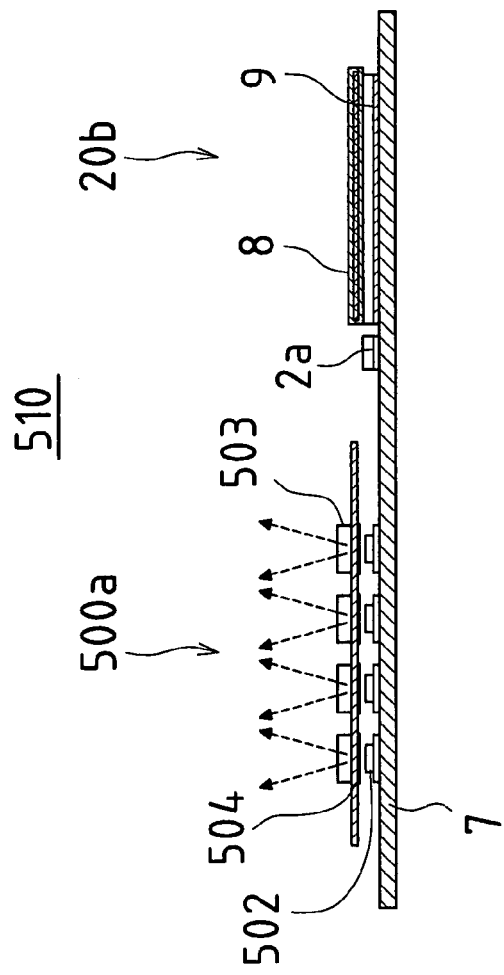
Figure 6:
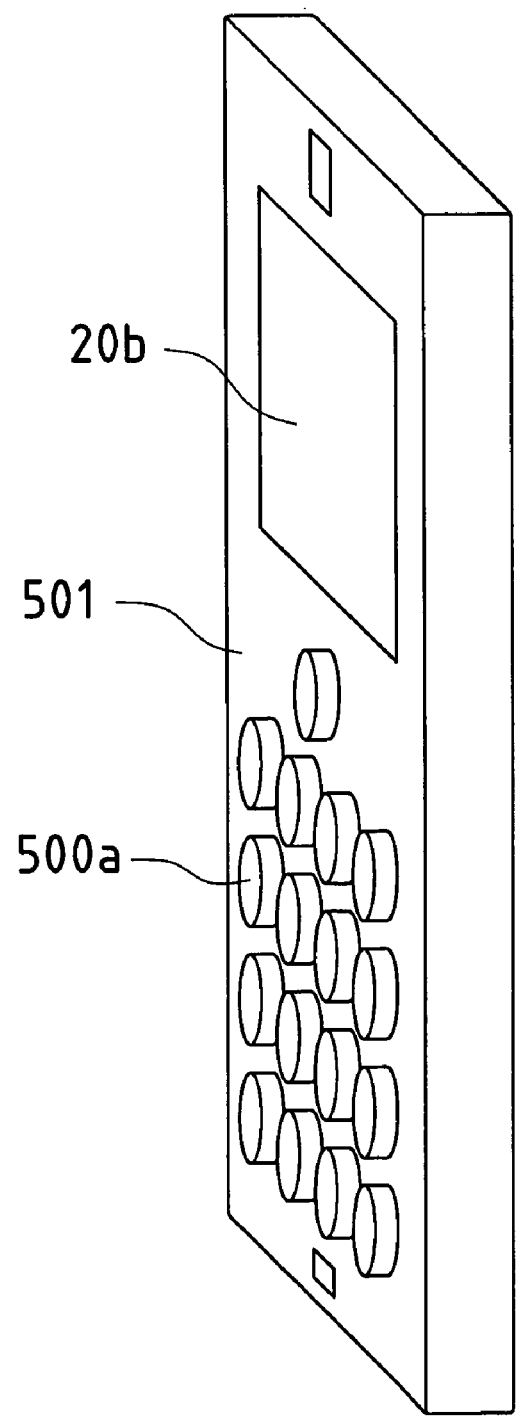
FIG. 6 is a schematic view of the mobile phone utilizing a backlight structure of the fifth embodiment of the present invention.
Figure 10:
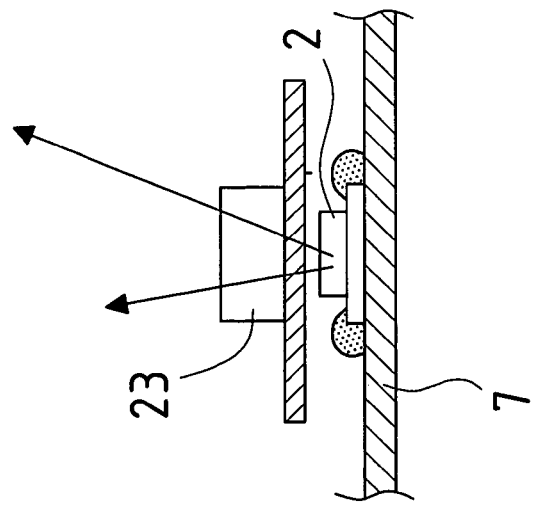
FIG. 10A is a cross-sectional view showing the outline of the internal structure of a mobile phone in which another example of a conventional art is used.
FIG. 10B is a partially enlarged cross-sectional view (ten key portion) showing the outline of the internal structure of a mobile phone in which another example of a conventional art is used.
Figure 10:
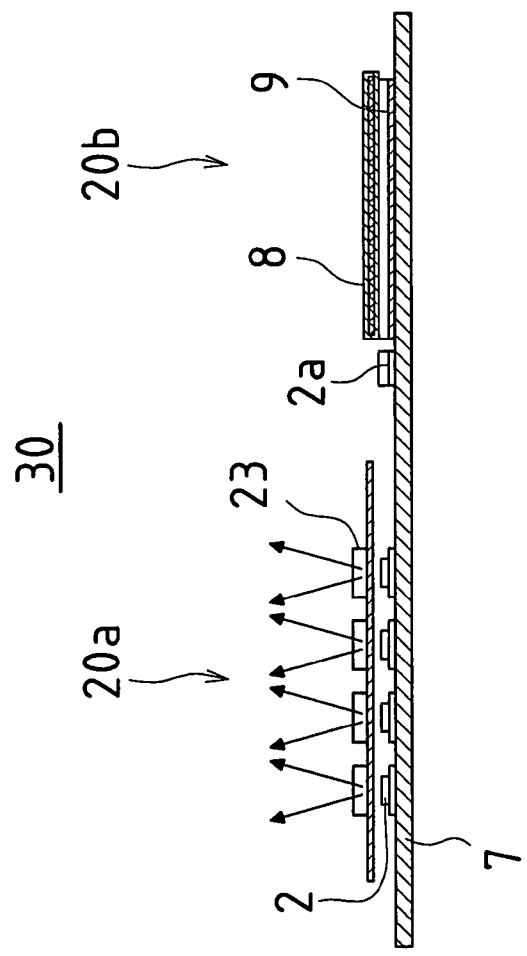

FIG. 5A is a cross-sectional view showing the outline of the internal structure of a mobile phone 500 utilizing a backlight structure 510 of a fifth embodiment of the present invention. FIG. 5B is a partially enlarged cross-sectional view (ten key portion) showing the outline of the internal structure of this mobile phone 500. FIG. 6 is a schematic view of the outline of this mobile phone 500. The fifth embodiment is the same as the conventional art described with reference to FIGS. 10A and 10B except the following aspects, so that the same components bear the same reference numeral, and only differences will be described below.

A backlight structure 510 of the mobile phone 500 is configured such that blue violet chip LEDs 502 having an emission wavelength of 400 to 430 nm are provided in a printed substrate 7 that is inside the mobile phone main body 501, and light of the blue violet chip LEDs 502 is transmitted through keypads 503 to which a wavelength-converting phosphor 504 is applied and is emitted.

In the printed substrate 7, the blue violet chip LEDs 502 are provided in positions corresponding to respective keys in the keypads 503, and thus a ten key portion 500a of the mobile phone 500 is formed. The liquid crystal screen portion 20b has the same structure as that of the conventional art described with reference to FIGS. 10A and 10B.

The blue violet chip LEDs 502 have an emission wavelength of 400 to 430 nm.

When the emission wavelength is smaller than 400 nm, the light is ultraviolet light that may affect adversely the human body and cause large damage, especially, to eyes. Therefore, in view of safety and health, visible light having an emission wavelength of 400 nm or more is preferable.

An emission wavelength of larger than 430 nm can be used, but in the case of a short emission wavelength of 430 nm or less, light energy is large and external efficiency is high. Therefore, in view of little power and low running cost, an emission wavelength of 430 nm or less is preferable.

The keypad 503 is formed of a transparent resin having translucent properties such as silicon resin, polycarbonate resin, and acrylic resin. In this keypad 503, the wavelength-converting phosphor 504 is applied onto the back face opposing the blue violet chip LED 502. Thus, the wavelength-converting phosphor 504 is applied, not to the blue violet chip LED 502, but to the back face of the keypad 503, so that in order to change the tone of the emission color, it is sufficient to replace the keypad 503 without performing bothering soldering work involved in removing the blue violet chip LED 502 from the printed substrate 7.

There is no limitation regarding the wavelength-converting phosphor 504, as long as it emits light by being excited by the light of the blue violet chip LED 502, and the wavelength-converting phosphor 504 can be formed of one type of phosphor or in combination of at least two types. This wavelength-converting phosphor 504 can provide visible light from violet to red by selecting the ratio of a combination of the emission wavelength of the blue violet chip LED 502, that is, an emission wavelength of 400 to 430 nm, and the emission wavelength of the wavelength-converting phosphor 504 that emits light by being excited by the light of the blue violet chip LED 502. Regarding the tone of this emission color, a desired tint can be created by adjusting the combination or the application state of the wavelength-converting phosphors 504. In the case of application of at least two types of wavelength-converting phosphors 504, they can be applied by overlapping each other, or the wavelength-converting phosphors 504 can be applied to different portions so as to form a pattern or a design.

The wavelength-converting phosphor 504 is not limited to be applied onto the back face of the keypad 503, and can be applied onto the surface of the keypad 503, as long as it is within the waveguide path from the blue violet chip LED 502 to a point where the light is transmitted through the keypad 503 and emitted out from the mobile phone main body 501. However, in this case, there is a concern that the wavelength-converting phosphor 504 can be peeled off because of operation with the keypad 503 over time, and therefore it is preferable to provide a protective film layer (not shown) on the keypads 503 or the entire surface of the mobile phone main body 501.

Furthermore, when forming the keypad 503, it is possible to disperse the wavelength-converting phosphor 504 inside the keypad 503. In this case, if the keypad 503 in which the state of dispersion of the wavelength-converting phosphor 504 is adjusted in accordance with a desired color tone is prepared as a replacement component of the mobile phone 500, the user can change the color to a desired emission color only by replacing the keypad 503 without adjusting the tint by application.

Furthermore, a film-like member in which the wavelength-converting phosphor 504 is dispersed can be interposed between the blue violet chip LED 502 and the keypad 503, or can be attached to the surface of the keypad 503. In this case, the color can be changed to a desired emission color by attaching or removing the film without replacing the keypad 503. In particular, when the film is attached to the surface of the keypad 503, it is not necessary to open the mobile phone main body 501 and take the keypad 503 out, and thus the colors can be changed in a simple manner.

In the fifth embodiment of the present invention, the mobile phone 500 is configured so as to change the emission color of the keypad 503. However, it can be configured so as to change the emission color of the liquid crystal screen portion 20b by changing the LED 2a for liquid crystal backlight illumination to a LED having an emission wavelength of 400 to 430 nm such as the blue violet chip LED 502 as described above. However, in this case, when the wavelength-converting phosphor 504 is applied to the backlight waveguide plate 9, soldering work involved in removing the liquid crystal cell 8 and the backlight waveguide plate 9 from the printed substrate 7 is necessary in order to change the emission color. Therefore, for the wavelength-converting phosphor 504, it is preferable that a film-like member in which the wavelength-converting phosphor 504 is dispersed is attached to the surface of the liquid crystal screen portion 20b.

In the fifth embodiment of the present invention, the backlight structure 510 of the mobile phone 500 has been described, but such a backlight structure 510 can be used in various electric products using at least one light source for display such as a LED, other than the mobile phone. In particular, this is useful in the case of mobile information terminals having a keypad that is frequently used during operation, with which operation and visual confirmation are frequently performed.

Sixth Embodiment

Figure 7:
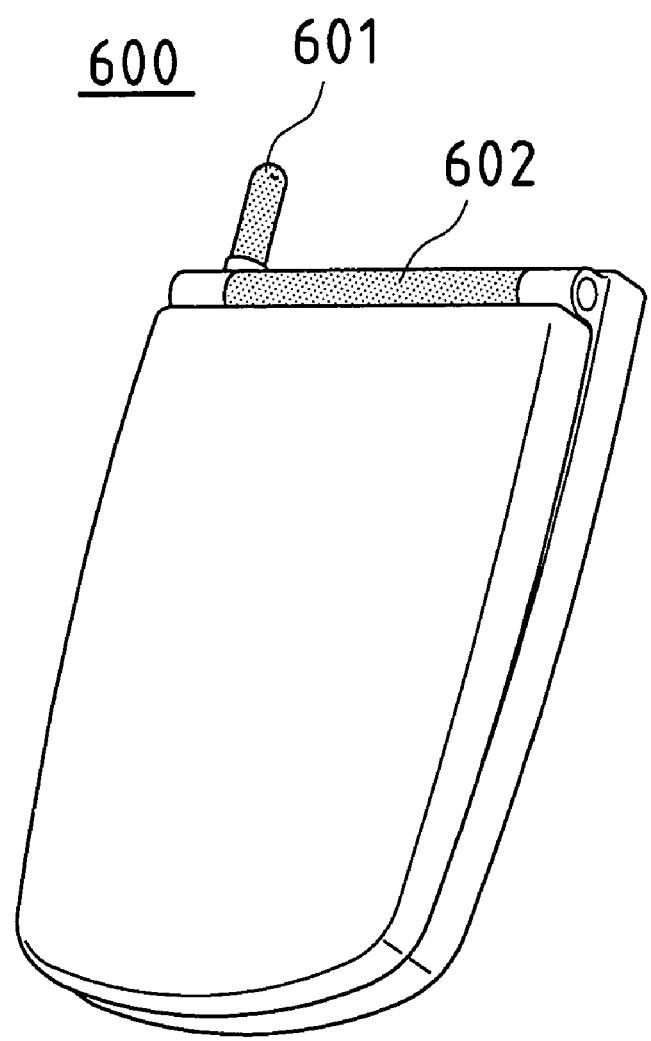
FIG. 7 is a schematic view of a mobile-phone of a sixth embodiment of the present invention.

FIG. 7 is a schematic view of a mobile phone 600 of a sixth embodiment of the present invention.

As shown in FIG. 7, an antenna portion 601 and a hinge portion 602 of a foldable mobile phone 600 may be formed of transparent resin having translucent properties to obtain a desired emission color. In this case, a blue violet chip LED may be provided as a light source exclusively used for the antenna portion 601 or the hinge portion 602, or the light of a blue violet chip LED for illuminating keypads may be used. When the light of a blue violet chip LED for illuminating keypads may be used, it is preferable to consider the arrangement or the fitting of electronic components not so as to block the light as much as possible in the waveguide path from the blue violet chip LED to the antenna portion 601 or the hinge portion 602. Furthermore, the antenna portion 601 and the hinge portion 602 may be coated with the wavelength-converting phosphor, or the wavelength-converting phosphor may be dispersed in a resin material that constitutes the antenna portion 601 or the hinge portion 602. Alternatively, a film in which the wavelength-converting phosphor is dispersed may be attached or may be interposed between these components and a blue violet chip LED. The case where the antenna portion 601 is changed so as to have a desired color be applied to a mobile phone (non-foldable type) as shown in FIG. 6.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is clamed is:

1. An electronic equipment comprising:
   at least one light source, in which light of the light source is guided and emitted from an operation member having translucent properties via an optical waveguide; and
   a region that contains phosphor, which is separate from the light source, for emitting visible light by being excited by the light from the light source, said region that contains phosphor is in a path through which the light of the fight source is guided,
   wherein said at least one light source is detachable from the region that contains phosphor,
   wherein the operation member is constituted by a plurality of keytops, and
   wherein the region that contains phosphor is a portion surrounding the light source contained in the vicinity of the light source.

2. The electronic equipment according to claim 1, wherein the phosphor is constituted by a plurality of types of phosphors that emit light with different colors from each other.

3. The electronic equipment according to claim 1, further comprising a plurality of regions that contain phosphor, wherein the plurality of regions that contain phosphor are contained in each of the respective plurality of keytops.

4. The electronic equipment according to claim 3, wherein the phosphor is constituted by a plurality of types of phosphors that emit light with different colors from each other.

5. The electronic equipment according to claim 4, wherein the plurality types of phosphors are arranged such that patterns, designs, letters, symbols or an arbitrary combination thereof can be recognized with their emitted light with the different colors.

6. The electronic equipment according to claim 4, wherein at least one of the plurality of types of phosphors is contained in each of the plurality of keytops.

7. The electronic equipment according to claim 1, wherein the electronic equipment is a mobile phone.

8. The electronic equipment according to any one of claims 2 to 6, wherein the plurality of keytops, respective region(s) that contain phosphor, and the optical waveguide are integrated into one piece, and the integrated piece including the plurality of keytops and the optical waveguide is configured to be removable with respect to a main body of the electronic equipment that comprises the light source.

9. The electronic equipment according to claim 8, wherein the electronic equipment is a mobile phone.

10. An electronic equipment comprising:
- a backlight which transmits light through an operation member and is emitted, and
- a wavelength-converting phosphor paint, which is separate from the backlight, emits light by being excited by the light of the backlight,
- wherein the backlight is detachable from the wavelength-converting phosphor paint,
- wherein the wavelength-converting phosphor paint is on the back face of the operation member, opposing the backlight.

11. The electronic equipment according to claim 10, wherein the emission wavelength of the backlight is in a range from 400 to 430 nm.

12. The electronic equipment according to claim 11, wherein the operation member is a keypad.

13. The electronic equipment according to any one of claims 10, 11, and 12, wherein the electronic equipment is a mobile phone.

14. The electronic equipment according to any one of claims 1 and 2 to 6, wherein the light source is an LED.

15. The electronic equipment according to claim 8, wherein the light source is an LED.

16. The electronic equipment according to claim 11, wherein the backlight is an LED.

17. An electronic equipment comprising:
- at least one light source, in which light of the light source is guided and emitted from an operation member having translucent properties via an optical waveguide; and
- a region that contains phosphor, which is separate from the light source, for emitting visible light by being excited by the light from the light source, said region that contains phosphor is in a path through which the light of the light source is guided,
- wherein said at least one light source is detachable from the region that contains phosphor,
- wherein the operation member is constituted by a plurality of keytops,
- wherein the region that contains phosphor is contained immediately below the upper surface of the keytops.

* * * * *